(12) United States Patent
Ivanov et al.

(10) Patent No.: US 10,747,731 B2
(45) Date of Patent: Aug. 18, 2020

(54) TRANSFERRING DATA USING UNIQUE IDENTIFIERS OF A TABLE OF A RELATIONAL DATABASE

(71) Applicant: VMware, Inc., Palo Alto, CA (US)

(72) Inventors: Ivaylo Ivanov, Sofia (BG); Vladimira Stankova, Sofia (BG)

(73) Assignee: VMware, Inc., Palo Alto, CA (US)

( * ) Notice: Subject to any disclaimer, the term of this patent is extended or adjusted under 35 U.S.C. 154(b) by 154 days.

(21) Appl. No.: 15/654,842

(22) Filed: Jul. 20, 2017

(65) Prior Publication Data
US 2019/0026311 A1 Jan. 24, 2019

(51) Int. Cl.
*G06F 16/188* (2019.01)
*G06F 9/455* (2018.01)
*G06F 16/31* (2019.01)
*G06F 11/34* (2006.01)

(52) U.S. Cl.
CPC ........ *G06F 16/192* (2019.01); *G06F 9/45558* (2013.01); *G06F 16/328* (2019.01); *G06F 11/3428* (2013.01); *G06F 2009/45591* (2013.01)

(58) Field of Classification Search
CPC .. G06F 11/3428; G06F 16/192; G06F 16/328; G06F 9/45558; G06F 7/00; G06F 17/30
USPC ........................................................ 707/743
See application file for complete search history.

(56) References Cited

U.S. PATENT DOCUMENTS

| | | | | |
|---|---|---|---|---|
| 6,167,405 A * | 12/2000 | Rosensteel, Jr. | ...... | G06F 16/283 |
| 7,548,898 B1 * | 6/2009 | Tarenskeen | ........... | G06F 16/214 |
| 9,582,524 B1 * | 2/2017 | Murali | ................... | G06F 16/214 |
| 9,996,562 B2 * | 6/2018 | Higginson | ............ | G06F 16/214 |
| 2010/0198972 A1 * | 8/2010 | Umbehocker | ........ | G06F 3/0604 709/226 |
| 2014/0279838 A1 * | 9/2014 | Tsirogiannis | ......... | G06F 16/211 707/603 |
| 2015/0106381 A1 * | 4/2015 | Gerstl | ................... | G06F 16/214 707/743 |

OTHER PUBLICATIONS

Mark Herring, "Data Ingestion and Streaming: Using sqoop to fetch many tables in parallel"; Hortonworks, Inc., (Mar. 18, 2016) https://community.hortonworks.com/articles/23602/sqoop-fetching-lot-of-tables-in-parallel.html.

(Continued)

*Primary Examiner* — Giovanna B Colan
(74) *Attorney, Agent, or Firm* — Thomas Horstemeyer, LLP (57) ABSTRACT

The present disclosure is related to devices, systems, and methods for transferring data using unique identifiers of relational databases. An example system can include a first server hosting a relational database and a second server coupled to the first server. The second server can be configured to assign a quantity of unique identifiers of a table of the relational database to each of a plurality of groups, perform a first transfer operation to transfer data corresponding to a first one of the plurality of groups via a first core of processing resources of the first server, and perform a second transfer operation to transfer data corresponding to a second one of the plurality of groups via a second core of the processing resources of the first server. The first transfer operation can be performed in parallel with the second transfer operation.

20 Claims, 4 Drawing Sheets

(56) References Cited

OTHER PUBLICATIONS

Oracle; "Data Pump Export" (Accessed: Jul. 20, 2017) https://docs.oracle.com/cd/B28359_01/server.111/b28319/dp_export.htm#i1007220.

Amazon Web Services; "Importing and Exporting Data From a MySQL DB Instance"; Amazon Relational Database Service, (Oct. 31, 2014) http://docs.aws.amazon.com/AmazonRDS/latest/UserGuide/MySQL.Procedural.Importing.html.

Amazon Web Services; "Using Replication to Export MySQL Data";Amazon Relational Database Service, (Oct. 31, 2014) http://docs.aws.amazon.com/AmazonRDS/latest/UserGuide/MySQL.Procedural.Exporting.NonRDSRepl.html.

Sqoop User Guide, "Incubating"; Sqoop, vol. 1.4.1 (Accessed: Jul. 20, 2017) https://sqoop.apache.org/docs/1.4.1-incubating/SqoopUserGuide.html.

* cited by examiner

Fig. 1

| PRIMARY KEY | TYPE | CLASS | TIME | ... | USERNAME |
|---|---|---|---|---|---|
| 1 | ServerStartedSession | 0 | 20170713.11.03.38.981 | ... | NULL |
| 2 | RoleAdded | 0 | 20170713.11.03.39.659 | ... | NULL |
| 3 | AlarmCreated | 0 | 20170713.11.03.40.583 | ... | NULL |
| ... | ... | ... | ... | ... | ... |
| K/5 | AlarmReconfigured | 0 | 20170713.11.04.43.086 | ... | NULL |
| (K/5)+1 | UserLogoutSession | 0 | 20170713.11.04.47.241 | ... | machine-db7 |
| (K/5)+2 | AlarmRemoved | 0 | 20170713.11.04.49.377 | ... | NULL |
| (K/5)+3 | UserLoginSession | 0 | 20170713.11.04.50.086 | ... | NULL |
| ... | ... | ... | ... | ... | ... |
| 2(K/5) | StatusChange.Manual | 2 | 20170713.11.05.27.411 | ... | vmonuser |
| 2(K/5)+1 | CustomFieldAdded | 0 | 20170713.11.05.35.589 | ... | Administrator |
| 2(K/5)+2 | CustomFieldAdded | 0 | 20170713.11.05.36.001 | ... | Administrator |
| 2(K/5)+3 | Task | 0 | 20170713.11.05.49.244 | ... | vcIntegrity |
| ... | ... | ... | ... | ... | ... |
| 3(K/5) | ScheduledTaskCreated | 0 | 20170713.11.06.07.007 | ... | vcIntegrity |
| 3(K/5)+1 | StatusChange.Manual | 2 | 20170713.11.06.09.113 | ... | vmonuser |
| 3(K/5)+2 | StatusChange.Auto | 1 | 20170713.11.06.11.622 | ... | vmonuser |
| 3(K/5)+3 | CustomFieldAdded | 0 | 20170713.11.06.17.132 | ... | Administrator |
| ... | ... | ... | ... | ... | ... |
| 4(K/5) | CustomFieldAdded | 0 | 20170713.11.07.22.589 | ... | Administrator |
| 4(K/5)+1 | AlarmCreated | 0 | 20170713.11.07.25.555 | ... | NULL |
| 4(K/5)+2 | Task | 0 | 20170713.11.07.26.741 | ... | vcIntegrity |
| 4(K/5)+3 | ScheduledTaskCreated | 0 | 20170713.11.07.35.852 | ... | vcIntegrity |
| ... | ... | ... | ... | ... | ... |
| K | UserLogoutSession | 0 | 20170713.11.08.01.000 | ... | machine-db7 |

VIEW_1: TUPLES ASSOCIATED WITH PRIMARY KEYS $1 \Rightarrow K/5$

VIEW_2: TUPLES ASSOCIATED WITH PRIMARY KEYS $(K/5)+1 \Rightarrow 2(K/5)$

VIEW_3: TUPLES ASSOCIATED WITH PRIMARY KEYS $2(K/5)+1 \Rightarrow 3(K/5)$

VIEW_4: TUPLES ASSOCIATED WITH PRIMARY KEYS $3(K/5)+1 \Rightarrow 4(K/5)$

VIEW_5: TUPLES ASSOCIATED WITH PRIMARY KEYS $4(K/5)+1 \Rightarrow K$

Fig. 4

TRANSFERRING DATA USING UNIQUE IDENTIFIERS OF A TABLE OF A RELATIONAL DATABASE

BACKGROUND

A virtualization manager can be hosted on a server. The virtualization manager can cause data, including information about the state of a network of computing devices coupled to the server, to be stored in a database.

BRIEF DESCRIPTION OF THE DRAWINGS

FIG. 2 is a visual representation of assigning a range of unique, serial identifiers of a table to groups for transfer according to the present disclosure.

DETAILED DESCRIPTION

A relational database refers to a database that organizes data into tables (or "relations") that can include a unique identifier associated with each entry of a table. The unique identifiers can be referred to as keys. The entries in the database can be rows in a table comprised of rows and columns. Beneficially, the unique identifiers of a relational database allow for quick retrieval of data corresponding to a particular unique identifier or a group of the unique identifiers. The unique identifiers can be referred to as primary keys. In some embodiments, a relational database can include serial, unique identifiers.

Data can be transferred from a table of a first relational database to a table of a second relational database. The speed and/or performance of transferring data may be limited by the processing resources of the machine(s) involved in transferring the data. Some previous approaches may transfer data using a single transfer operation. When a table of data is to be transferred from a database, some previous approaches may transfer data retrieved from a full table scan. For example, if a table includes one hundred entries to be transferred, then a full table scan would include all one hundred entries such that all one hundred entries may be transferred in a single subset of data. Some previous approaches may utilize a single core of processing resources to perform a transfer operation. Some previous approaches, may transfer data via multiple cores of processing resources, but transfer the data via a single transfer operation. The term "transfer" is used herein to include either or both of "export" and "import".

In contrast, at least one embodiment of the present disclosure can utilize the unique identifiers of a database (e.g., a relational database) to transfer data from the database via multiple transfer operations. Each of the transfer operations can transfer data retrieved from a partial table scan. In contrast to a full table scan, a partial table scan does not include all entries of a table, but rather a portion of the entries. The multiple transfer operations can be performed in parallel using multiple cores of a machine that hosts a virtualization manager for which the database stores data. A standalone tool can control the transfer. The standalone tool can be a universal tool, where "universal tool" means that the transfer can be controlled regardless of the source database. The standalone tool need not be located on the machine hosting the source database and therefore the machine hosting the source database does not enforce requirements of what tool is used. At least one embodiment can improve the performance of transferring data such that the multiple transfer operations are completed in a fraction of the time of a single transfer operation of some previous approaches. As used herein, "in parallel" refers to at least two operations that are performed concurrently even though the operations may begin and/or end at different times. As used herein, "instruction" refers to a command to take an action whereas "operation" refers to taking the action.

The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. A group or plurality of similar elements or components may generally be referred to herein with a single element number. For example a plurality of reference elements 108-1, 108-2, 108-3, and 108-4 may be referred to generally as 108. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
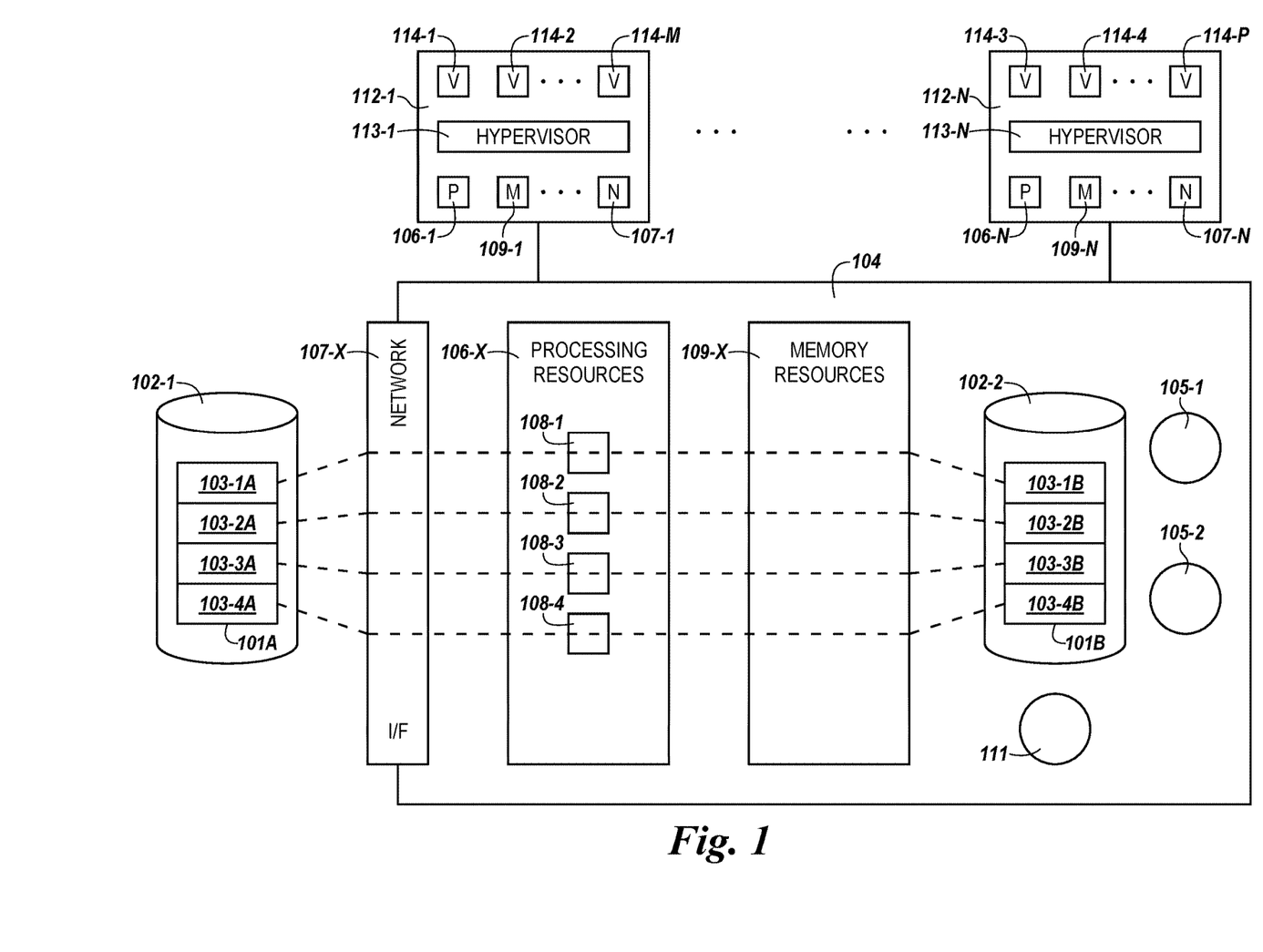
FIG. 1 is a general logical diagram of an infrastructure for transferring data based on unique identifiers according to the present disclosure.

FIG. 1 is a general logical diagram of an infrastructure for transferring data based on unique identifiers according to the present disclosure. The infrastructure can include a machine 104 coupled to a first relational database 102-1 via a network interface 107-X. The first relational database 102-1 can include a plurality of tables, although only one table 101A is illustrated. The first relational database 102-1 is illustrated as a single component but represents both the relational database 102-1 and the machine hosting the relational database 102-1, which is not specifically illustrated. The machine 104 can include processing resources 106-X (e.g., a number of processors) having a first core 108-1, a second core 108-2, a third core 108-3, and a fourth core 108-4, however embodiments are not limited to any particular number of cores. Each of the cores 108 can be analogous to a thread of the processing resources 106-X.

The machine 104 can include memory resources 109-X (e.g., a machine-readable medium). Memory resources can be non-transitory and can include volatile and/or non-volatile memory, which can serve as primary and/or secondary storage. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. Memory resources can store machine-readable and executable instructions to perform various functions as described herein.

The machine 104 can host a virtualization manager 105 and can serve as a cloud management server. A virtualization manager 105 can be used to control, monitor, and/or operate a virtual infrastructure of computing devices 112-1, . . . , 112-N. Each of the computing devices 112 can communicate with the virtualization manager 105 directly. The computing devices 112 can be either physical or virtual. For example, the computing devices 112 can be physical devices including processing resources 106-1, . . . , 106-N and memory resources 109-1, . . . , 109-N such as may be implemented in a desktop computer, mobile device, or a server. As another example, the computing devices 112 can host hypervisors 113-1, . . . , 113-N that execute virtual computing instances (VCIs) 114. For example, the computing device 112-1 includes hypervisor 113-1 that executes VCIs 114-1, 114-2, . . . , 114-M and the computing device 112-N hosts a hypervisor 113-N that executes VCIs 114-3, 114-4, . . . , 114-P. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. Examples of VCIs include virtual machines (VMs), virtual workloads, data compute nodes, clusters, and containers, among others.

The term "virtual computing instance" covers a range of computing functionality. The term "virtual machine" refers generally to an isolated user space instance, which can be executed within a virtualized environment. Other technologies aside from hardware virtualization can provide isolated user space instances, also referred to as data compute nodes. Data compute nodes may include non-virtualized physical hosts, virtual machines (VMs), containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads.

The VCIs 114 can be provisioned with processing resources 106-1, . . . , 106-N and/or memory resources 109-1, . . . , 109-N and can communicate via a network interface 107-1, . . . , 107-N. The processing resources 106-1, . . . , 106-N and the memory resources 109-1, . . . , 109-N provisioned to the VCIs 114 can be local and/or remote to the computing devices 112. For example, in a software defined data center, the VCIs 114 can be provisioned with resources that are generally available to the software defined data center and not tied to any particular hardware device. The VCIs 114 can be moved to different computing devices (not specifically illustrated), such that a different hypervisor 113 manages the VCIs 114.

As illustrated in FIG. 1, the machine 104 can host a first virtualization manager 105-1 and a second virtualization manager 105-2. The second virtualization manager 105-2 can be an upgraded version of the first virtualization manager 105-1. The machine 104 can also host a second relational database 102-2, which may be referred to as an embedded database for the second virtualization manger 105-2, as opposed to the external database (first relational database 102-1), which can store data for the first virtualization manager 105-1. The machine 104 can be external to the machine hosting the first relational database 102-1.

A virtualization manager 105 can cause data associated with the computing devices 112, such as core data and historical data, to be stored in a relational database 102. Core data describes the inventory and/or configuration of the computing device 112. The inventory of a virtualization manager 105 includes the computing devices 112 that are managed by the virtualization manager 105. The core data may be necessary for applications running on the computing devices 112 to function properly. For example, the core data can be persisted in the relational database 102 so that in case of a crash, the virtualization manager 105 can recover successfully. The amount of core data that may be stored can be limited to a maximum amount by the virtualization manager 105. For example, one megabyte (MB) to one gigabyte (GB) of core data can be stored for each of the computing devices 112. The amount of core data can be dependent on the size of the inventory and/or the features of the computing devices 112.

In contrast to core data, historical data may not be required for applications running on the computing devices 112 to function properly. However, historical data can be stored for long periods of time (i.e., persisted). Historical data can be used to analyze the virtualization manager 105, analyze the computing devices 112, troubleshoot the virtualization manager 105, and/or troubleshoot the computing devices 112. In some instances, the amount of historical data that can be stored may not be limited by the virtualization manager 105. Over time as the virtualization manager 105 and computing devices 112 operate, the amount of historical data can increase. In some instances, historical data can account for up to ninety percent of data stored by the virtualization manager 105. The maximum amount of historical data that is stored and how long the historical data may be stored (persists) can each be a user-defined quantity.

A database 102 used by a virtualization manager 105 can be external or embedded. An external deployment of the database 102-1 refers to the database 102-1 not being deployed on the same machine 104 that hosts the virtualization manager 105-1 for which the database 102-1 stores data. An external deployment of the database 102-1 can be a third party database 102-1 that uses a particular relational database management system (RDBMS). Examples of RDBMSs include MSSQL, Oracle, PostgreSQL, etc. During installation of the virtualization manager 105-1 on the machine 104, the virtualization manager 105-1, which is a first party virtualization manager, can be manually configured to use the external database 102-1. The virtualization manager 105-1 can be configured to manage a plurality of VCIs 114 on behalf of the third party. An embedded deployment of the database 102-2 refers to the database 102-2 being deployed on the same machine 104 that hosts the virtualization manager 105-2 for which the database 102-2 stores data. The embedded deployment of the database 102-2 can be a first party database 102-2 that uses an RDBMS different from the RDBMS used by the external deployment of the database 102-1. The virtualization manager 105-2 can be preconfigured to use the embedded database 102-2 because the embedded deployment of the database 102-2 is a first party database on the same machine 104 that hosts the corresponding virtualization manager 105-2. The illustration of two virtualization managers 105-1, 105-2 being hosted by the machine 104 is intended to show that a first virtualization manager 105-1 can be upgraded to a different version (the second virtualization manager 105-2). In general, the machine 104 may not simultaneously host two different operational virtualization managers 105. As part of the upgrade of the virtualization manger 105, it may be desirable to migrate the database 102 from an external deployment to an embedded deployment. The machine 104 can be configured to perform various transfer operations in response to the upgrade of the virtualization manager 105. As part of the migration, data from the external deployment of the database 102-1 can be transferred to the embedded deployment of the database 102-2.

Data stored in the database 102 can be stored in tables. For ease of illustration, the first database 102-1 is illustrated as having a first table 101A and the second database 102-2 is illustrated as having corresponding table 101B, although the databases 102 can include additional tables. Each entry of the table 101 can have a unique identifier. The unique identifiers are discussed in further detail in association with FIG. 2 below. To facilitate migration from the external database 102-1 to the embedded database 102-2, the machine 104 (e.g., via a standalone tool 111 executed by the machine 104) can be configured to assign a respective quantity of the unique identifiers from the table 101 to each of a plurality of groups, such that each group corresponds to a subset 103 of the data in the table 101. In some embodiments, the machine 104 can be configured to assign the respective quantities of unique identifiers such that each of the plurality of groups is assigned an equal quantity of unique identifiers. As illustrated in FIG. 1, the first table 101A in the first database 102-1 includes subsets 103-1A, 103-2A, 103-3A, 103-4A of data and the table 101B in the second database 102-2 includes subsets 103-1B, 103-2B, 103-3B, 103-4B of data. Embodiments are not limited to any particular quantity of groups. As an example, a table including one hundred entries would include one hundred unique identifiers, each entry being associated with one of the unique identifiers. Each group can be assigned ten of the unique identifiers such that there are ten groups. The first ten unique identifiers can be assigned to a first group. The data corresponding to the first ten unique identifiers (e.g., a first subset of data) corresponds to the first group. The second ten unique identifiers can be assigned to a second group. The data corresponding to the second ten unique identifiers (e.g., a second subset of data) corresponds to the second group. The assignment of the unique identifiers to the groups can be independent of amount of data corresponding to the unique identifiers. For example, a first group of the unique identifiers can correspond to 1 GB of data of the table. A second group of the unique identifiers can correspond to 3 GB of data of the table.

The machine 104 that hosts the virtualization manager 105 can also execute instructions that comprise a standalone tool 111. The standalone tool 111 can be configured with credentials for accessing the external database 102-1 (e.g., when the first virtualization manager 105-1 is manually configured to use the external database 102-1). The credentials can be provided by a third party that manages a machine (not specifically illustrated) hosting the external database 102-1. The standalone tool 111 can perform the actions of assigning the identifiers to groups as described herein. The standalone tool 111 can also perform the transfer of data from the external database 102-1 to the embedded database 102-2 as described herein. For example, the standalone tool 111 can control a first transfer operation to transfer a first subset 103-1A of data corresponding to the unique identifiers of a first group via the first core 108-1 of the processing resources 106-X and a second transfer operation to transfer a second subset 103-2A of data corresponding to the unique identifiers of a second group via the second core 108-2. The standalone tool can control additional transfer operations subsequent to the first transfer operation or the second transfer operation such that all of the data corresponding to the unique identifiers from the table 101A in the external database 102-1 is transferred to the table 101B in the embedded database 102-2. For example, the standalone tool 111 can control a third transfer operation to transfer a third subset 103-3A of data corresponding to the unique identifiers of a third group via the third core 108-3 of the processing resources 106-X and a fourth transfer operation to transfer a fourth subset 103-4A of data corresponding to the unique identifiers of a fourth group via the fourth core 108-4.

Any number of the transfer operations can be performed in parallel (up to a maximum number of cores 108 and/or threads available from the processing resources 106-X). For example, the first transfer operation can be performed in parallel with the second transfer operation. The data corresponding to the entries associated with each group of the unique identifiers can each be transferred via a transfer operation. As illustrated, the data can be transferred through a network interface 107-X of the machine 104, through the processing resources 106-X and through memory resources 109-X to be stored in the embedded database 102-2 in a table 101B as subsets 103-1B, 103-2B, 103-3B, 103-4B of data corresponding to the subsets 103-1A, 103-2A, 103-3A, 103-4A of data of the first table 101A. As illustrated, the memory resources 109-X can represent either or both of volatile and non-volatile memory. For example, during the transfer operation, the data may be stored temporarily in volatile memory, such as RAM, and then stored persistently in non-volatile memory, such as an SSD.

Although various transfer operations may be performed in parallel, a first transfer operation may be completed before a second transfer operation (or vice versa). As an example where two transfer operations are performed in parallel, responsive to completion of the first transfer operation or the second transfer operation, a third transfer operation can be performed. The third transfer operation can include transferring a third subset 103-3A of data via the first core 108-1 or the second core 108-2 depending on which transfer operation is completed first. For example, responsive to completion of the first transfer operation prior to completion of the second transfer operation, the third transfer operation can be performed to transfer data corresponding to a third one of the plurality of groups to the table 101B in the second relational database 102-2 via the first core 108-1. Or, responsive to completion of the second transfer operation before the first transfer operation, the third transfer operation can be performed to transfer data corresponding to a third one of the plurality of groups to the table 101B in the second relational database 102-2 via the second core 108-2. If another core of the processing resources 106-X, such as the third core 108-3 or the fourth core 108-4, becomes available, then the next available core can also be used to perform the third transfer operation in parallel with the first transfer operation and/or the second transfer operation.

In some embodiments, data associated with two or more tables can be transferred. For example, historical data can be included in two separate tables. The first table can include data associated with events of the computing devices 112 managed by the virtualization manager 105. Events can include, but are not limited to, malfunctions of one or more of the computing devices 112. Each event can be associated with a unique identifier. The first table can include metadata associated with each event. The metadata can include, but is not limited to, a date and/or time stamp for the event, on which of the computing devices 112 the event occurred, and/or the type of the event, such as user login. The first table can be a parent table and each event can be a parent record. The second table can include additional data (e.g., detailed information, such as user name, login method, user location, etc.) about the event. The additional information is associated with the same unique identifier as the corresponding event. The second table can be a child of the first table and each record of the second table can be a child of the corresponding parent record of the first table. Not every event of the first table may have corresponding data in the second table. However, multiple records of the second table can be associated with a corresponding unique identifier of the first table. A single event can have multiple records including additional information associated with the single event. Some previous approaches may include first transferring data of a parent table from an external database to a machine and then, upon completion of transferring data of the parent table, transferring data of a child table from the external database to the machine. In contrast, at least one embodiment of the present disclosure includes transferring the data of a parent table and a child table from the external database 102-1 to the machine 104 in parallel in response to a single transfer instruction. For example, the metadata and the additional information associated with each event can be transferred in parallel.

In at least one embodiment, the machine 104 can be configured to transfer, in parallel, data of the first table and the second table corresponding to a first group (e.g., a first ten) of the unique identifiers and data of the first table and the second table corresponding to a second group (e.g., a second ten) of the unique identifiers via the first core 108-1 and the second core 108-2, respectively. Because some events may have corresponding data in the second table while other events may not, transfer operations via the first core 108-1 and the second core 108-2 may not be completed at the same time. Data of the first table and the second table corresponding to a third group (e.g., a third ten) of the unique identifiers can be transferred via a next available core of the processing resources 106-X. If the first core 108-1 first completes transferring the data of the first table and the second table corresponding to the first group of the unique identifiers then the data of the first table and the second table corresponding to the third group of the unique identifiers can be transferred via the first core 108-1. If the second core 108-2 first completes transferring the data of the first table and the second table corresponding to the second group of the unique identifiers then the data of the first table and the second table corresponding to the third group of the unique identifiers can be transferred via the second core 108-2. If another core of the processing resources 106-X becomes available (e.g., the third core 108-3 or the fourth core 108-4) then the data of the first table and the second table corresponding to the third group of the unique identifiers can be transferred via the next available core.

The machine 104 can be at a different location than the external relational database 102-1. For example, the machine 104 can be in a different geographical location (e.g., in a different state or country) than the external database 102-1. The standalone tool 111 can initiate and control the transfer of data from the external database 102-1 to the embedded database 102-2. Neither the external database 102-1, nor the machine hosting the external database 102-1, is in control of the transfer of the data. Rather, the standalone tool 111 initiates the multiple transfer operations for transfer of the data via the processing resources 106-X of the machine 104. The standalone tool 111 is compatible with various setups of third party relational databases. The standalone tool 111 can use the unique identifiers of the table 101A of the external database 102-1 to transfer data corresponding to the unique identifiers, independent of the setup of the external database 102-1. For example, data can be transferred in a format common to the embedded database 102-2 and the external database 102-1. An example of a common format is a comma-separated value (CSV) file. Likewise, the standalone tool 111 can transfer data from the external database 102-1, independent of an RDBMS used by the external database 102-1. For example, the standalone tool 111 can transfer data from a first database, such as the external database 102-1, that uses a first RDBMS and transfer data from a second relational database (not shown in FIG. 1) that uses a second RDBMS. The standalone tool 111 may be regarded as a universal tool to transfer data from multiple, different external databases.

According to at least one embodiment of the present disclosure, a method can include assigning a first portion (e.g., first subset 103-1A of data) of a first table 101A of a third party relational database 102-1, independent of a size of the first portion, corresponding to a first range of unique, serial identifiers from the first table 101A for transfer to a second table 101B of a hosted relational database 102-2 via a first core 108-1 of processing resources 106-X. The method can include assigning a second portion (e.g., second subset 103-2A of data) of the table 101A of the third party relational database 102-1, independent of a size of the second portion, corresponding to a second range of unique, serial identifiers of the first table 101A for transfer to the second table 101B of the hosted relational database 102-2 via the second core 108-2 of the processing resources 106-X. The method can include transferring the first portion and the second portion in parallel. The first portion and the second portion can be assigned such that the second range is consecutive to the first range. The method can include assigning a third portion (e.g., third subset 103-3A of data) of the first table 101A, independent of a size of the third portion, for transfer via a next available core of the processing resources 106-X. The third portion can correspond to a third range of unique, serial identifiers of the first table 101A. The third portion can be assigned such that the third range is consecutive to the second range. Each range of the unique, serial identifiers can be consecutive such that data corresponding to all of the unique, serial identifiers of a transfer instruction is transferred. In contrast to some previous approaches that rely on built-in transfer tools of the source (e.g., a machine hosting the relational database 102-1), at least one embodiment does not require that a tool controlling the transfer reside on or be executed by the relational database from which the data is being transferred. The method can include transferring the first portion and the second portion from a first server (not specifically illustrated) to a second server 104 using a standalone tool 111 of the second server.

FIG. 2 is a visual representation of assigning a range of unique, serial identifiers of a table to groups for transfer according to the present disclosure. The table 220 can be part of a relational database, such as the relational database 102 illustrated in FIG. 1. The table 220 can include a column of unique identifiers, which may be referred to as primary keys 224. The primary keys 224 can be serially sequential and range from a beginning unique identifier (e.g., 1) associated with a first entry of the table to an ending unique identifier (e.g., K) associated with a last entry of the table 220. In some embodiments, the primary keys 224 can increase in order numerically by one unit for each consecutive row 228-1, . . . , 228-K of the table 220. Although not illustrated in FIG. 2, in various embodiments, the primary keys 224 can increase in order numerically, but by different numbers of units (e.g., 1, 2, 4, 10, 11 . . . ). The primary keys 224 are indicated in FIG. 2, at first, with numerical values ("1", "2", "3"). Then, the primary keys are indicated with discontinuities (" . . . ") to illustrate that a table 220 can include a large quantity of primary keys 224. After the first discontinuity, the primary keys 224 are represented notationally as though the table includes primary keys 224 from "1" to "K". For example, after the first discontinuity, a primary key 224 is illustrated as "K/5" and a serially subsequent primary key 224 is illustrated as "(K/5)+1". An example of a primary key 224 is an event identifier, for example, where the table 220 stores data pertaining to events.

Each row 228 in the table 220 can include a primary key 224 and data organized by a quantity of attributes 226, such as "type" 226-1, "class" 226-2, "time" 226-3, . . . , "username" 266-A. The data corresponding to the attributes 226 for a particular row 228 may be referred to as a tuple. By way of example, a table 220 can store data for a quantity of computing devices (e.g., VCIs) numbered from 1 to K (e.g., 10,000 computing devices, where K=10,000). For example, the data can be historical data. Other examples of attributes can include, processing resources used, memory resources used, network resources used, a name of the computing devices, a client for whom the computing devices is provisioned, status of the computing devices, and error history of the computing devices, category, argument identifiers, argument data, object type, object name, chain identifiers (e.g., where the primary key 224 is an event identifier and the chain identifier indicates different events having different event identifiers that were part of a same chain of events), among other attributes. Every attribute 226 for every primary key 224 does not necessarily have a data value. For example, as illustrated in some of the attributes 226-A, a value may be "NULL". The example of data illustrated for the table 220 may be representative of a parent table, as described herein. A child table may have more detailed data that uses significantly more storage. For example, argument data can include strings of data that may be too large to illustrate meaningfully in a Figure because the strings of data could occupy a significant portion, the entirety of, or multiple pages.

A respective range of the primary keys 224 can be assigned to each of a plurality of groups 222-1, 222-2, 222-3, 222-4, and 222-5. The groups 222 can be referred to as views. Although FIG. 2 illustrates five groups, embodiments are not limited to any particular quantity of groups. Embodiments can include two or more groups. The first group 222-1 ("View_1") is assigned primary keys 1 to K/5 (because there are five groups). The second group 222-2 ("View_2") is assigned primary keys (K/5)+1 to 2(K/5). The third group 222-3 ("View_3") is assigned primary keys 2(K/5)+1 to 3(K/5). The fourth group 222-4 ("View_4") is assigned primary keys 3(K/5)+1 to 4(K/5). The fifth group 222-5 ("View_5") is assigned primary keys 4(K/5)+1 to 5(K/5). Each of the groups 222 can account for 20% of the tuples of the table 220. However, each tuple may not necessarily include the same amount of data. Therefore it is possible that each group 222 includes the same amount of data (20% of the total), but it is not necessary.

In the example of FIG. 2, each of the groups 222 include a same quantity of the primary keys 224. However, in at least one embodiment, at least one of the groups 222 can be assigned a range of the primary keys 224 with a different quantity of primary keys 224 than another one of the groups 222. In at least one embodiment, not all of the data of the table 220 may be transferred. For example, data corresponding to the primary keys 1 to 4(K/5) can be transferred. In such an example, the quantity of primary keys 4(K/5) can be split into five groups 222.

It is important to note that although FIG. 2 illustrates each of the groups 222 as separate from one another and separate from the table 220, the table 220 is not broken up nor is the data corresponding to the primary keys 224 assigned to each of the groups 222 stored in different tables than the table 220. Rather, in response to an instruction to transfer the data of the table 220, data corresponding to the primary keys 224 assigned to each of the groups 222 is retrieved from the table 220 for transferring. The data corresponding to the primary keys 224 assigned to the first group 222-1 can be transferred via a first core of processing resources, such as the first core 108-1 of the processing resources 106-X illustrated in FIG. 1. In parallel with the data corresponding to the unique, serial identifiers assigned to the first group 222-1, data corresponding to the unique, serial identifiers assigned to the second group 222-2 can be transferred via a second core of the processing resources (e.g., the second core 108-2). Data corresponding to the unique, serial identifiers assigned to the third group 222-3 can be transferred via the next available core of the processing resources until all of the data of the table 220 (the data corresponding to the fifty unique, serial identifiers) has been transferred. For example, the next available core can be the next core to complete the transfer of data (e.g., the first core 108-1 or the second core 108-2) or a different core that was previously unavailable (e.g., the third core 108-3 or the fourth core 108-4). Thus, at least one embodiment can enable flexible hardware utilization but also prevent resource starvation.

According to at least one embodiment of the present disclosure, instructions can be executed to assign, to each of a plurality of groups 222, a respective range of unique, serial identifiers (e.g., primary keys 224) from a table 220 of a relational database. The assignment can be independent of an RDBMS of the relational database. Each respective range of unique, serial identifiers can correspond to a subset of data of the relational database. The instructions can be executed to assign the respective range of the unique, serial identifiers to the each of the plurality of groups by assigning an equal quantity of the unique, serial identifiers to each of the plurality of groups. The instructions can be executed to assign the equal quantity of the unique, serial identifiers to each of the plurality of groups independent of a respective amount of data corresponding to the unique, serial identifiers assigned to each of the plurality of groups.

The instructions can be executed to cause each subset of the data corresponding to each of the plurality of groups to be transferred via a respective one of a plurality of cores of processing resources of a server hosting the relational database. The instructions can be executed to cause at least two of the respective subsets of the data to be transferred in parallel.

The instructions can be executed by a machine hosting a different relational database that is coupled to the server hosting the relational database. The instructions can be executed to transfer each of the plurality of groups via a respective one of a plurality of cores of processing resources of the machine to a different table in the different relational database. In some embodiments, the instructions can be executed to assign the identifiers and cause the data to be transferred via an agent operating on the server hosting the relational database. The agent can be instructions that are executable by the server. For example, the server may be a third party server hosting a third party database and the agent can be a first party agent.

Although FIG. 2 shows numerical unique identifiers ranging from 1 to K, embodiments are not so limited. Numerical unique identifiers can start with any number and end with any other number. Unique, serial identifiers do not have to be consecutive and can have gaps in the sequence of any length. For example, numerical unique, serial identifiers can include 1, 3, 5, 7, etc. or 1, 4, 7, 10, etc. The unique identifiers are not limited to being serial and may not have any pattern (e.g., 1, 4, 6, 7, 10). The unique identifiers are not limited to being numerical. The unique identifiers can be, for example, alphabetical, alphanumeric, dates, and/or times. However, for relational databases, the unique identifiers may advantageously be the numerical values comprising primary keys from the relational database because the primary keys already exist in the relational database. This can allow the performance of the transfer operations to scale well for different size databases having different numbers of primary keys.

Figure 3:
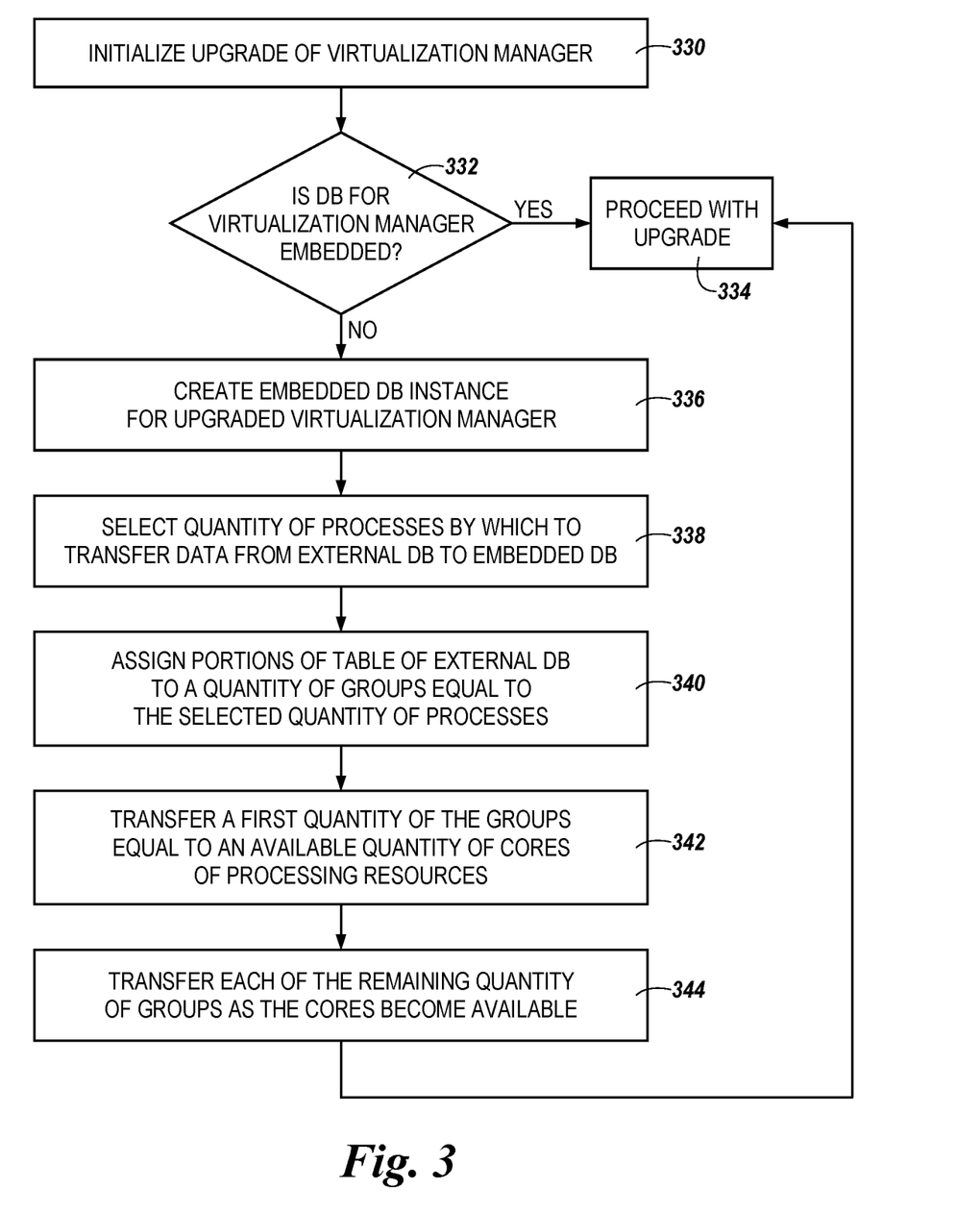
FIG. 3 is a flow chart illustrating an example of transferring data using unique identifiers of a table of a relational database.

FIG. 3 is a flow chart illustrating an example of transferring data using unique identifiers of a table of a relational database. At 330, an initialization of an upgrade to a virtualization manager (such as the virtualization manager 105-1 illustrated in FIG. 1) can begin. At 332, a determination can be made whether the database for the virtualization manager is embedded. If the database is embedded, at 334, the upgrade to the virtualization manager can proceed. However, if the database is not embedded, at 336, an embedded database instance for the upgraded virtualization manager (e.g., virtualization manager 105-2 illustrated in FIG. 2) can be created.

At 338, a quantity of processes by which to transfer data from a table of the external database to a corresponding table of the embedded database can be selected. Various criteria can be used for selecting the quantity of processes. For example, a criterion can be a quantity of cores of processing resources available for the transfer, where a greater quantity of available cores suggests a greater quantity of processes. Another example of a criterion is a total size of the table to be transferred, where a greater size suggests a greater quantity of processes. An example of a criterion is a quantity of entries in the table, where a greater quantity of entries suggests a greater quantity of processes. In some embodiments, the quantity of processes by which to transfer data can be selected based on performance data from testing.

At 340, portions of the table of the external database can be assigned to a quantity of groups equal to the selected quantity of processes. For example, and as illustrated in FIG. 5, if five processes are selected, then the table can be divided into five groups, which may be referred to as views. As described herein, the table can be divided into groups based on the primary keys, where each group includes an equal quantity of primary keys.

At 342, a first quantity of the groups (equal to an available quantity of cores of processing resources) can be transferred in parallel. For example, if there are five groups and two cores are available, then two groups can be transferred in parallel using the two cores. At 344, each of the remaining quantity of groups can be transferred s the cores become available. For example, after a core finishes transferring a group, it can be used to transfer a next one of the remaining groups. As another example, if a core not previously used to transfer a group becomes available, it can be used to transfer a next one of the remaining groups. Once all of the groups have been transferred, the upgrade to the virtualization manager can proceed as indicated at 334.

Figure 4:
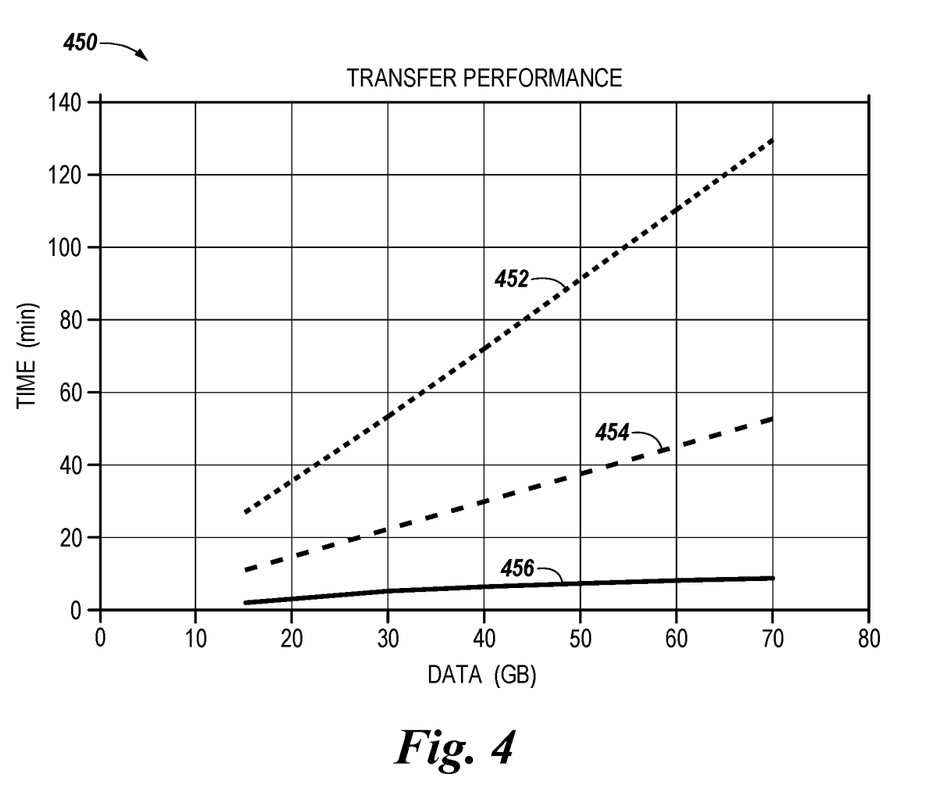
FIG. 4 is a graphical comparison of transfer performance of some previous approaches to that of at least one embodiment according to the present disclosure.

FIG. 4 is a graph 450 of transfer performances of some previous approaches and at least one embodiment according to the present disclosure. The graph 450 shows the amount of time in minutes to transfer an amount of data in GB. The lines 452 and 454 represent the transfer performances of some previous approaches. The line 456 represents the transfer performance of at least one embodiment of the present disclosure. The line 452 represents a previous approach to transferring data that includes a single command or process to generate a database file from a single table. An example of the previous approach represented by the line 452 is transferring data using SQLite. The previous approach represented by the line 452 takes an excess of two hours to transfer 70 GB of data. The line 454 represents a previous approach that uses a CSV file as the data medium (e.g., versus generating a database file from a single table as with SQLite). The previous approach represented by the line 454 takes less time than the previous approach represented by the line 452. However, the previous approach represented by the line 454 still transfers the data via a single transfer operation using a single core or thread of processing resources. The previous approach represented by the line 454 transfers 70 GB of data in just under an hour.

As shown in the graph 450, at least one embodiment of the present disclosure can transfer various amounts of data without a significant increase in the amount of time to complete the transfer. Fifteen GB of data can be transferred in approximately two minutes and 70 GB of data can be transferred in approximately ten minutes. Because at least one embodiment includes multiple transfer operations, performed in parallel, to transfer data (e.g., via multiple cores of a processing resource), the multiple transfer operations can be completed in less time than a single transfer operation of some previous approaches. For example, if data is transferred using two transfer operations performed in parallel then the slowest of the two transfer operations will determine how long it will take to transfer the data. There is approximately a 1:1 ratio of an increase in time to complete the transfer to an increase in the amount of data transferred. In contrast, the previous approaches represented by the lines 452 and 454 each have an approximate 4.8× increase in the amount of time to complete the transferring in response to increasing the amount of data to be transferred from 15 GB to 70 GB.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a machine coupled to a first relational database including a plurality of tables, wherein the machine is configured to:
select a first quantity of a plurality of processes for performing a transfer operation to a table in a second relational database based on a data size of a particular one of the plurality of tables to be transferred;
assign a respective quantity of unique identifiers from the particular one of the plurality of tables to individual ones of a second quantity of a plurality of groups, wherein the second quantity of the plurality of groups corresponds to the first quantity of the plurality of the processes;
perform a first transfer operation of data corresponding to a first subset of the plurality of groups to the table in the second relational database, the first subset of the plurality of groups being determined based on a first available quantity of processing cores from a plurality of processing cores of the machine; and
perform a second transfer operation of data corresponding to a second subset of the plurality of groups to the table in the second relational database, the second subset of the plurality of groups being determined based on a second available quantity of the plurality of processing cores of the machine.

2. The apparatus of claim 1, wherein the machine is further configured to:
responsive to completion of the first transfer operation prior to completion of the second transfer operation, perform a third transfer operation of data corresponding to a third subset of the plurality of groups to the table in the second relational database.

3. The apparatus of claim 1, wherein the machine is further configured to perform additional transfer operations subsequent to the first transfer operation or the second transfer operation such that all of the data corresponding to the unique identifiers from a particular table is transferred to the table in the second relational database.

4. The apparatus of claim 1, wherein the machine is further configured to transfer data corresponding to the unique identifiers from a particular table and data corresponding to the unique identifiers from a different table, in parallel, in response to a single transfer instruction.

5. The apparatus of claim 1, wherein individual ones of the unique identifiers are associated with an event of at least one of a plurality of computing devices coupled to the machine;
wherein a particular table is a parent table and the event is a parent record of the parent table;
wherein the parent record corresponds to a child record of a child table; and
wherein the machine is further configured to transfer, in parallel, data associated with the parent record and the child record.

6. The apparatus of claim 5, wherein the parent record includes metadata associated with the event,
wherein the child record includes additional information associated with the event; and
wherein the machine is further configured to transfer, in parallel, the metadata and the additional information.

7. The apparatus of claim 1, wherein the machine is further configured to:
transfer the data from the first relational database, wherein the first relational database uses a first relational database management system (RDBMS); and
transfer data from a different relational database, wherein the different relational database uses a second RDBMS.

8. The apparatus of claim 1, wherein the machine hosts the second relational database,
wherein the first relational database comprises a third party relational database;
wherein the machine hosts a virtualization manager configured to manage a plurality of virtual computing instances on behalf of the third party relational database;
wherein the machine is configured to access the first relational database via credentials provided by the third party relational database; and
wherein the machine is configured to perform the first transfer operation and the second transfer operation in response to an upgrade of the virtualization manager.

9. The apparatus of claim 1, wherein the unique identifiers from the table are serial and range from a beginning unique identifier associated with a first entry of the table and an ending unique identifier associated with a last entry of the table.

10. The apparatus of claim 9, wherein the machine is further configured to assign the respective quantities of the unique identifiers such that individual ones of the plurality of groups is assigned an equal quantity of the unique identifiers.

11. A non-transitory machine-readable medium storing instructions executable to:
select a first quantity of a plurality of processes for performing a transfer operation for a table of a relational database based on a data size of the table;
assign, to each of a second quantity of a plurality of groups, a respective range of unique serial identifiers from the table of the relational database, wherein the assignment is independent of a relational database management system (RDBMS) of the relational database, wherein the second quantity of the plurality of groups corresponds to the first quantity of the plurality of processes of a server hosting the relational database, and wherein a respective range of the unique serial identifiers corresponds to a subset of data of the relational database;
cause a first transfer operation of data for a first subset of the plurality of groups to the table, the first subset of the plurality of groups being determined based on a first available quantity of processing cores from a plurality of processing cores; and
cause a second transfer operation of data for a second subset of the plurality of groups to the table in a second relational database, the second subset of the plurality of groups being determined based on a second available quantity of the plurality of processing cores.

12. The non-transitory machine-readable medium of claim 11, wherein the instructions are executable by a machine hosting a different relational database that is coupled to the server hosting the relational database, and further including instructions to transfer individual ones of the plurality of groups via the first subset of the plurality of processing cores of the machine to a different table in the different relational database.

13. The non-transitory machine-readable medium of claim 12, further including instructions to assign the unique serial identifiers and cause the data for the first subset of the plurality of processing cores to be transferred via an agent operating on the server hosting the relational database.

14. The non-transitory machine-readable medium of claim 11, wherein the instructions to assign the respective range of the unique serial identifiers to the plurality of groups include instructions to assign an equal quantity of the unique serial identifiers to the plurality of groups.

15. The non-transitory machine-readable medium of claim 14, further including instructions to assign the equal quantity of the unique serial identifiers to the plurality of groups independent of a respective amount of data corresponding to the unique serial identifiers assigned to the plurality of groups.

16. A method, comprising:
   selecting a quantity of a plurality of groups for performing a transfer operation for a first table in a third party relational database based on a data size of the first table;
   assigning, to a first subset of a plurality of groups, a first portion of the first table of the third party relational database corresponding to a first range of unique serial identifiers from the first table of the third party relational database for transfer to a second table of a first party relational database, wherein the first subset of the plurality of groups is determined based on a first available quantity of processing cores from a plurality of processing cores of a server;
   assigning, to a second subset of the plurality of groups, a second portion of the first table of the third party relational database corresponding to a second range of unique serial identifiers from the first table of the third party relational database for transfer to the second table of the first party relational database wherein the second subset of the plurality of groups is determined based on a second available quantity of processing cores from the plurality of processing cores;
   transferring the first portion to the second table; and
   transferring the second portion to the second table in an instance in which the transfer of the first portion has been initiated.

17. The method of claim 16, further comprising assigning the first portion and the second portion of the table of the third party relational database such that the second range is consecutive to the first range.

18. The method of claim 16, further comprising assigning a third portion of the first table of the third party relational database, independent of a size of the third portion, for transfer via a next available core of processing cores, wherein the third portion corresponds to a third range of unique serial identifiers of the table of the third party relational database.

19. The method of claim 18, further comprising assigning the third portion of the first table of the third party relational database such that the third range is consecutive to the second range.

20. The method of claim 16, wherein the first party relational database is an embedded database for a virtualization manager executed in the server.

* * * * *